United States Patent [19]

Klug

[11] 3,896,107

[45] July 22, 1975

[54] DERIVATIZED ETHYL CELLULOSE

[75] Inventor: Eugene D. Klug, Wilmington, Del.

[73] Assignee: Hercules Incorporated, Wilmington, Del.

[22] Filed: Mar. 8, 1974

[21] Appl. No.: 449,568

[52] U.S. Cl............. 260/211 R; 424/180; 117/166; 117/161 R; 106/163
[51] Int. Cl............................................ C07c 97/00
[58] Field of Search........................ 260/211 R, 212

[56] References Cited
UNITED STATES PATENTS
2,702,249   2/1955   Baird.............................. 260/211 R OTHER PUBLICATIONS
Pigman, "The Carbohydrates", page 696, Academic Press, Inc., New York, 1957.

Primary Examiner—Johnnie R. Brown
Assistant Examiner—Cary B. Owens
Attorney, Agent, or Firm—William S. Alexander

[57] ABSTRACT

Modified cellulose derivatives are disclosed which contain tertiary amine group substituents in the amount of 0.05 to 0.4 mole per anhydroglucose unit of the cellulose. The modified ethyl cellulose materials are insoluble in water but soluble in dilute aqueous acid solutions. They are useful, e.g., as coating materials for medicaments since their acid solubility makes them soluble in stomach acids. They are also useful in applications where conventional ethyl cellulose is employed such as lacquer, varnish and adhesive applications.

5 Claims, No Drawings

DERIVATIZED ETHYL CELLULOSE

This invention relates to ethyl cellulose containing small amounts of a tertiary amine modifying substituent which leads to significant changes in the properties of the ethyl cellulose. In a specific embodiment, it relates to normally water-insoluble ethyl cellulose having small amounts of dialkylaminoalkyl substitution whereby it becomes soluble in dilute aqueous acid systems.

In U.S. Pat. Nos. 2,623,041 and 2,623,042 there are disclosed celulose and partially substituted derivatives of cellulose which can contain diethylaminoethyl radicals substituted thereon. These derivatives are said to be soluble in water, aqueous alkali, and aqueous acid. The principal thrust of these patents, when directed toward conventional derivatives of cellulose, is toward materials of low substitution level of the conventional substituent. With reference to normally water-insoluble cellulose derivatives, it is said that a high degree of diethylaminoethyl substitution is required to impart acid solubility to the product.

Now in accordance with this invention, there are provided derivatives of water-insoluble ethyl cellulose substituted with tertiary amine group-containing substituents, which are soluble in dilute aqueous acids while remaining insoluble in water or in alkaline media. These derivatives have an ethoxyl D.S. of about 1.8 to 2.8 and a tertiary amine group substituent D.S. of about 0.05 to 0.4.

The preferred tertiary amine group-containing radicals for substituting ethyl cellulose according to this invention are those having the general formula

$$R-N-R'_2$$

in which R is $-CH_2CH_2-$, $-CH_2-CH_2-CH_2-$, or $-CH_2-CHOH-CH_2-$ and R' is methyl, ethyl, propyl, or isopropyl. Exemplary radicals of this type are beta-dimethylaminoethyl, gamma-dimethylaminopropyl, beta-diisopropylaminoethyl, beta-diethylaminoethyl, gamma-diethylaminopropyl and gamma-diethylamino-beta-hydroxypropyl.

Modified ethyl cellulose of the type described herein is soluble in very low concentrations of acid. For example, a product having dialkylaminoalkyl D.S. of 0.2 to 0.3 can form a 1 percent solution in 0.25 percent aqueous acetic acid. In view of the almost total insolubility of ethyl cellulose in water, this is quite surprising.

The term "D.S." employed herein is intended to designate the number of ethoxyl or tertiary amine groups which are combined with the cellulose per anhydroglucose unit thereof. The ethoxyl D.S. is determined by the well-known Zeisel-Morgan method which is reported beginning at page 500 of volume 18, Industrial & Engineering Chemistry, Analytical Edition (1946). Tertiary amine D.S. is determined from the nitrogen content.

The tertiary amine group substituted ethyl cellulose of this invention exhibits all of the useful properties of conventional ethyl cellulose. Thus, it is insoluble in neutral or alkaline aqueous media and soluble in organic media such as toluene-alcohol mixtures. It exhibits excellent heat and light stability, and its films remain tough and flexible at low temperatures. Additionally, it has quite low flammability.

By virtue of their similarity to ethyl cellulose, the tertiary amine group substituted ethyl cellulose derivatives of this invention are useful in any application where ethyl cellulose is currently employed. The primary applications for ethyl cellulose are in the coatings field such as lacquer, varnish, dip coatings, adhesives and electrical insulation. Since materials of this type are normally provided and employed in solution form, the solubility of the modified ethyl cellulose in water at slightly acid pH represents a clear advantage since it allows the application of coatings from economically and environmentally preferable aqueous media. Additionally, it has been found that upon drying these coatings become water insoluble and resistant to swelling in water.

On the other hand, the unique properties of these products make them useful in applications where ethyl cellulose is not useful. For example, they can be used as medicament coatings, since their acid solubility makes them soluble in stomach acids.

It has also been found that solutions of these derivatives have a higher degree of surface activity than any of the presently commercially available water-soluble cellulose derivatives. For example, a 0.2 percent solution of diethylaminoethyl ethyl cellulose of about 2.35 ethoxyl D.S. and about 0.3 diethylaminoethyl D.S. in 0.25 percent acetic acid has surface tension of 38.2 to 38.6 dynes/cm. This compares to 42 to 43 for hydroxypropyl cellulose of M.S. 4, about 64 hydroxyethyl cellulose and about 71 for carboxmethylcellulose.

When an aqueous solution of a tertiary amine-containing ethyl cellulose according to this invention is heated, a temperature is reached at which the viscosity increases and gelation occurs. The gelation temperature is related to both the tertiary amine group D.S. and the ethoxyl D.S. For a given ethoxyl D.S. the gelation temperature increases as the tertiary amine group D.S. is increased. Decreasing the ethoxyl D.S. with constant tertiary amine D.S. also increases the gelation temperature. This property makes the products of this invention useful in gel lacquers for dip coating.

The modified ethyl cellulose derivatives of this invention can be prepared by reacting alkali cellulose with ethyl chloride and a dialkylaminoalkyl halide. Reactions of this general type are known in the art for preparing cellulose ethers. In a preferred procedure, raw cellulose is treated with alkali, preferably sodium hydroxide, in the presence of the dialkylaminoalkyl halide until the cellulose is sufficiently swelled and the dialkylaminoalkyl substituent has reacted. Ethyl chloride and additional alkali are then added to accomplish the ethylation. It is also possible to aminoalkylate a commercial ethyl cellulose by treating it with the dialkylaminoalkyl halide in the presence of alkali.

The tertiary amine substituent can be added to the ethyl cellulose by several routes. It is preferred to employ a dialkylaminoalkyl halide possessing the desired structure as set forth above, i.e., having the general formula $X-R-N-R'_2$. Exemplary of such compounds are beta-diethylaminoethyl chloride, gamma-diethylaminopropyl chloride, beta-diisopropylaminoethyl chloride, beta-dimethylaminoethyl chloride, and gamma-dimethylaminopropyl chloride.

The tertiary amination can also be accomplished with a mixture of ethylene imine and ethyl chloride according to the equation

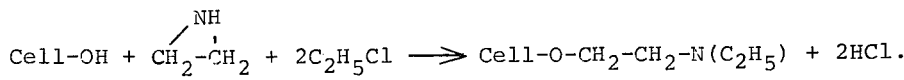

Other alkyl chlorides, e.g., methyl, propyl, or isopropyl, could be used in place of ethyl chloride in the above reaction sequence.

Another alkylation reagent is the reaction product of epichlorohydrin and a dialkylamine:

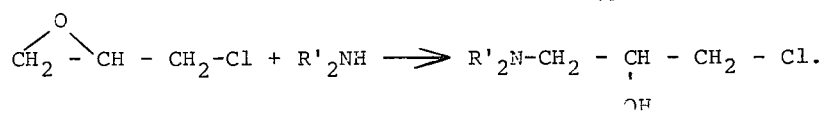

R' in this instance is as defined above.

In any of the amination schemes discussed above, the alkyl chloride moiety can be replaced by other alkyl halides such as the bromides, iodides, or fluorides. Additionally, the dialkylaminoalkyl halide can be the amine, per se, or it can be a salt thereof such as a hydrochloride, hydrobromide, or sulfate.

In preparing the tertiary amine containing ethyl cellulose of this invention according to the preferred process, small particle cellulose is slurried in an organic liquid in which ethyl cellulose is soluble and the dialkylaminoalkyl halide and 50% NaOH are added to the slurry. The concentration of NaOH is sufficient to assure an alkali/cellulose ratio of about 0.1 to 1.0. This slurry is agitated for sufficient time at room temperature to permit maximum swelling of the cellulose and to react the dialkylaminoalkyl halide. At this point, additional alkali is added to adjust the alkali/cellulose ratio to about 3 to 6 and the water/cellulose ratio to about 2 to 6 and the slurry is cooled to about 5° to 25°C. Ethyl chloride is added, and the slurry is agitated thereafter while slowly bringing the temperature to about 125° to 150°C., preferably 130° to 140°C. The temperature is maintained at this point and agitation is continued until substantially all of the ethyl chloride has reacted. Work-up is accomplished by precipitating the product with water, followed by neutralization to a pH of about 9 and water washing.

The following examples will illustrate the preparation of the dialkylaminoalkyl ethyl cellulose ethers of this invention. Parts and percentages are by weight unless otherwise indicated.

EXAMPLE 1

Twenty parts of cellulose was slurried in about 200 parts of t-butanol. To this, 13.7 parts of 50 percent sodium hydroxide was added. This was stirred for about 45 minutes at which time 12.2 parts diethylaminoethyl chloride hydrochloride was added and agitation was continued for another 15 minutes. After a reaction period of 16 hours at 70°C., excess caustic was neutralized with acetic acid, then the product was filtered out and washed with 80% methanol. It had a diethylaminoethyl D.S. of 0.22.

Twelve parts of the thus prepared diethylaminoethyl cellulose was mixed with 137 parts of 50 percent sodium hydroxide and added to an autoclave with about 150 parts of dioxane. The slurry was cooled to about 4°C. and about 59 parts of ethyl chloride was added. The autoclave was capped, heated with agitation to 130°C. over a 2-hour period and held at 130°C. for 14 hours.

The diethylaminoethyl ethyl cellulose was precipitated with water and excess alkali was neutralized with acetic acid. The precipitated product was then washed thoroughly in water, removed from thhe water and dried.

The product of the above two-stage reaction had diethylaminoethyl D.S. of 0.22 and ethoxyl D.S. of 2.13. It was insoluble in 1 percent acetic acid at room temperature, but soluble at 5°C. Upon warming from 5°C. it remained dissolved until a temperature of 33°C. was reached.

EXAMPLE 2

To a stirred slurry of 12.0 parts wood pulp, 150 parts dioxane, 8.0 parts diethylaminoethyl chloride hydrochloride and 16 parts water, there was added 11.9 parts 50% NaOH. The slurry was stirred for 45 minutes after which 93 additional parts 50 percent NaOH, and 16.0 parts solid NaOG were added. Then 59 parts ethyl chloride was added and the mixture was reacted for 14 hours at 130°C.

The product was purified by filtering off the admixture, stirring in water, neutralizing excess alkali with acetic acid and water washing. This product had a diethylaminoethyl D.S. of 0.13 and an ethoxyl D.S. of 2.2. A 1 percent solution in 0.25 percent acetic acid had a gelation temperature of 28°C.

EXAMPLE 3

To a solution of 23 parts of ethyl cellulose of ethoxyl D.S. 2.35 in 300 parts dioxane was added 11.4 parts 50 percent aqueous NaOH. The mixture was agitated and 11.2 parts diethylaminoethyl chloride hydrochloride was added. After stirring for several minutes to assure complete dispersal of the alkali, the mass was transferred to a sealed reaction vessel and all air was displaced with nitrogen. The solution was heated with agitation for 16 hours at 70°C., following which the product was precipitated by agitation in a large excess of water. The alkali in the slurry was neutralized with acetic acid to a pH of 7 and the product was washed free of salts with water.

The product had a diethylaminoethyl D.S. of 0.21. It was insoluble in water but formed a 1 percent solution in 0.25 percent aqueous acetic acid at 3°C. On being warmed, the solution gelled at about 35°C.

EXAMPLES 4 to 6

The procedure of Example 3 was repeated except that the ratios of reactants were varied in order to increase the diethylaminoethyl substitution level as follows:

| | | |
|---|---|---|
| Example No. 4 - 50% Diethylaminoethyl | alkali: | 22.8 parts |
| | chloride: | 15 parts |
| | D.S.: | 0.30 |
| Example No. 5 - 50% Diethylaminoethyl | alkali: | 30.4 parts |
| | chloride: | 22.4 parts |
| | D.S.: | 0.36 |
| Example No. 6 - 50% Diethylaminoethyl | alkali: | 34.2 parts |
| | chloride: | 33.6 parts |
| | D.S.: | 0.38 |

Each of these was soluble both at 3°C. and at 25°C. Their gel points were 48°, 67°, and 56°C., respectively.

EXAMPLES 7 to 10

Four twenty-gram portions of ethyl cellulose (ethoxyl D.S. 2.32) were dissolved in 300 ml. dioxane. These solutions were stirred and to two of them was added dimethylaminoethyl chloride hydrochloride and to the others dimethylaminopropyl chloride hydrochloride. After stirring for 30 minutes at room temperature, 50% NaOH was added to each. The dispersions were stirred for one minute, then transferred to pressure vessels. The air in the pressure vessels was displaced with nitrogen and with continued agitation the mixtures were heated to 70°C. in 1 hour and kept at 70°C. for 16 hours. The products were worked up as in Example 1. They had good solubility in 0.25% aqueous acetic acid. The following table summarizes the pertinent data.

|  | Example 7 | Example 8 | Example 9 | Example 10 |
|---|---|---|---|---|
| Ethyl cellulose | 20.0 parts | 20.0 parts | 20.0 parts | 20.0 parts |
| Dioxane | 300 " | 300 " | 300 " | 300 " |
| Dimethylaminoethyl chloride hydrochloride | 16.7 " | 16.7 " | | |
| Dimethylaminoisopropyl chloride hydrochloride | | | 18.4 " | 18.4 " |
| 50% NaOH | 20.3 " | 26.9 " | 20.3 " | 26.9 " |
| Dimethylamino ethyl D.S. | 0.255 | 0.30 | | |
| Dimethylaminoisopropyl D.S. | | | 0.21 | 0.235 |
| 1% solution in 0.25% acetic acid | | | | |
| Viscosity (cps) | 175 | 170 | 150 | 160 |
| Gelation Temperature °C. | 35 | 47 | 31 | 35 |

Films were cast from 1 percent solution in 0.25% aqueous acetic acid. They were dried overnight at 35°C. and cured for 2 hours at 70°C. The resulting films were insoluble in water and did not appear to be swollen significantly by water.

What I claim and desire to protect by Letters Patent is:

1. Ethyl cellulose substituted with tertiary lower alkyl amine group-containing substituents and having an ethoxyl D.S. of about 1.8 to 2.8 and a tertiary amine group substituent D.S. of about 0.05 to 0.4, said ethyl cellulose being soluble in dilute aqueous acid media and insoluble in neutral and alkaline aqueous media.

2. Dialkylaminoalkyl ethyl cellulose wherein the dialkylaminoalkyl substituent has the general formula

R-N-R′₂ in which R is a radical selected from the class consisting of —CH₂—CH₂—, —CH₂—CH₂—CH₂—, and —CH₂—CH(OH)—CH₂— and R′ is a radical selected from the class consisting of methyl, ethyl, propyl, and isopropyl, said dialkylaminoalkyl ethyl cellulose having an ethoxyl D.S. of about 1.8 to 2.8 and a dialkylaminoalkyl D.S. of about 0.05 to 0.4 and being soluble in dilute aqueous acid media and substantially insoluble in neutral or alkaline aqueous media.

3. Diethylaminoethyl ethyl cellulose having an ethoxyl D.S. of about 1.8 to 2.8 and a diethylaminoethyl D.S. of about 0.05 to 0.4, said diethylaminoethyl ethyl cellulose being soluble in dilute aqueous acid media and substantially insoluble in neutral or alkaline aqueous media.

4. Dimethylaminoethyl ethyl cellulose having an ethoxyl D.S. of about 1.8 to 2.8 and a dimethylaminoethyl D.S. of about 0.05 to 0.4, said dimethylaminoethyl ethyl cellulose being soluble in dilute aqueous acid media and substantially insoluble in neutral or alkaline aqueous media.

5. Dimethylaminoisopropyl ethyl cellulose having an ethoxyl D.S. of about 1.8 to 2.8 and a dimethylaminoisopropyl D.S. of about 0.05 to 0.4, said dimethylaminoisopropyl ethyl cellulose being soluble in dilute aqueous media and substantially insoluble in neutral or alkaline aqueous media.

* * * * *